United States Patent
Yoshii et al.

(10) Patent No.: US 8,341,804 B2
(45) Date of Patent: Jan. 1, 2013

(54) GROMMET

(75) Inventors: Kinya Yoshii, Toyota (JP); Fumimori Imaeda, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/140,335

(22) PCT Filed: Dec. 19, 2008

(86) PCT No.: PCT/JP2008/073211
§ 371 (c)(1),
(2), (4) Date: Jun. 16, 2011

(87) PCT Pub. No.: WO2010/070765
PCT Pub. Date: Jun. 24, 2010

(65) Prior Publication Data
US 2011/0247172 A1    Oct. 13, 2011

(51) Int. Cl.
*F16L 5/00* (2006.01)
(52) U.S. Cl. .................. 16/2.1; 174/152 G; 174/153 G
(58) Field of Classification Search .............. 16/2.1–2.5; 174/152 G, 153 G, 167, 650, 668; 277/606, 277/616; 248/56
See application file for complete search history.

(56) References Cited

U.S. PATENT DOCUMENTS

| | | | | |
|---|---|---|---|---|
| 4,675,937 A * | 6/1987 | Mitomi | .......................... | 16/2.1 |
| 6,489,559 B2 * | 12/2002 | Nakata et al. | ................ | 174/651 |
| 6,603,078 B2 * | 8/2003 | Okuhara et al. | .......... | 174/153 G |
| 6,675,439 B2 * | 1/2004 | Hashimoto | ....................... | 16/2.1 |
| 6,708,366 B2 * | 3/2004 | Ono et al. | ........................ | 16/2.5 |

FOREIGN PATENT DOCUMENTS

| | | |
|---|---|---|
| JP | 63-59012 U | 4/1988 |
| JP | 6-80976 U | 11/1994 |
| JP | 2001-225690 A | 8/2001 |
| JP | 2006-188964 A | 7/2006 |

OTHER PUBLICATIONS

International Search Report mailed Mar. 3, 2009 of PCT/JP2008/073211.

* cited by examiner

*Primary Examiner* — William L. Miller
(74) *Attorney, Agent, or Firm* — Kenyon & Kenyon LLP (57) ABSTRACT

A grommet is provided which can reduce an insertion load without decreasing a disengagement load of an inserting member. The inserting member, having a leg portion and a head portion formed by increasing the diameter of a tip end of the leg portion, is inserted from one end side of a body portion of the grommet into an insertion hole and attached to an inserted member with the grommet interposed. On the one end side from a groove portion formed in an outer circumferential surface of the body portion, a diameter of the insertion hole is equal to or larger than a diameter of the head portion. On the other end side from the groove portion, the grommet has a small diameter portion in which a diameter of the insertion hole is smaller than the diameter of the head portion and is equal to or larger than a diameter of the leg portion.

2 Claims, 7 Drawing Sheets

GROMMET

This is a 371 national phase application of PCT/JP2008/073211 filed 19 Dec. 2008, the content of which is incorporated herein by reference.

TECHNICAL FIELD

The present invention relates to a grommet, and more particularly to a grommet which engages with an opening formed in an inserted member and attaches an inserting member inserted in the opening to the inserted member.

BACKGROUND ART

A shape of a conventional grommet is disclosed, for example, in Japanese Patent Laying-Open No. 2006-188964 (Patent Document 1). Japanese Patent Laying-Open No. 2006-188964 (Patent Document 1) discloses an example of an attachment structure for attaching an engine cover covering an engine to an engine component, in which the diameter of an attachment part formed in the engine member and the diameter of a hole formed in a tubular grommet are defined thereby improving the efficiency of the attaching operation.
Patent Document 1: Japanese Patent Laying-Open No. 2006-188964

DISCLOSURE OF THE INVENTION

Problems to be Solved by the Invention

In the grommet disclosed in Japanese Patent Laying-Open No. 2006-188964 (Patent Document 1), if the rigidity of the grommet is low, the deformation amount of the grommet increases when the attachment part (inserting member) is inserted in the hole formed in the grommet, and the load applied by the grommet pressing the inserting member is increased. As a result, the load required to insert the inserting member into the hole (referred to as an insertion load in the subject description) is increased, resulting in poor installation workability.

The present invention is made to solve the aforementioned problem, and a main object of the present invention is to provide a grommet which can reduce only the insertion load when the inserting member is inserted into the grommet, without reducing the load required when the inserting member attempts to be disengaged from the grommet (referred to as disengagement load).

Means for Solving the Problems

A grommet in accordance with the present invention engages with a peripheral portion of an opening formed in an inserted member and is interposed between an inserting member inserted into the opening and the inserted member to attach the inserting member to the inserted member. The grommet includes a tubular body portion. The body portion has an insertion hole into which the inserting member is inserted. The body portion includes a first flange portion shaped in a collar protruding radially outward of the body portion at one end and a second flange portion shaped in a collar protruding radially outward of the body portion at the other end which is an end on the side opposite to the one end. In an outer circumferential surface of the body portion, a groove portion is formed such that a part of the outer circumferential surface is depressed in an elongated shape along a circumferential direction of the outer circumferential surface between the first flange portion and the second flange portion in an axial direction. The groove portion engages with the peripheral portion to attach the grommet to the inserted member. The first flange portion has a thrust surface on the other end side. The second flange portion has another thrust surface on the one end side. The inserting member has a leg portion and a head portion formed by increasing a diameter of a tip end of the leg portion. The inserting member is inserted from one end side of the body portion into the insertion hole and is attached to the inserted member. On the one end side from the groove portion, the diameter of the insertion hole is equal to or larger than a diameter of the head portion. On the other end side from the groove portion, the grommet has a small diameter portion. A diameter of the insertion hole at the small diameter portion is smaller than the diameter of the head portion and is equal to or larger than a diameter of the leg portion. When the inserting member is inserted from the one end side into the insertion hole, the inserting member abuts on an inner wall surface of the insertion hole at a location on the other end side with respect to the thrust surface, the thrust surface comes into surface contact with the inserted member, and the second flange portion is deformed such that the diameter of the insertion hole is increased. When the inserting member attempts to be disengaged from the grommet, the inserting member abuts on the other end, another thrust surface comes into surface contact with the inserted member, and the second flange portion is deformed such that the diameter of the insertion hole is reduced.

The above-noted grommet preferably has a reduced diameter portion in which a diameter of the insertion hole is gradually reduced from the one end toward the other end. The insertion hole is formed to have a diameter equal to the diameter of the head portion of the inserting member, at the reduced diameter portion.

Effects of the Invention

In accordance with a grommet of the present invention, the insertion load of the inserting member on the grommet is reduced, so that the inserting member is easily fitted into the grommet. Therefore, the operator can easily attach the inserting member to the inserted member by pushing the inserting member into the insertion hole, thereby improving the workability of installing the inserting member. In addition, the disengagement load of the inserting member on the grommet is increased, so that the inserting member is not easily disengaged from the grommet. Therefore, such an inconvenience can be prevented in that the inserting member is detached from the insertion hole and a component having the inserting member attached thereto drops off

DESCRIPTION OF THE REFERENCE SIGNS 10, 110 grommet, 12, 112 body portion, 14, 114 one end, 16, 116, the other end, 18, 118 outer circumferential surface, 20 first flange portion, 22 second flange portion, 24, 124 small diameter portion, 26,126 reduced diameter portion, 27, 127 inner wall surface, 30 groove portion, 32, 34, 132 thrust surface, 40, 140 insertion hole, 80, 180 inserting member, 82, 182 head portion, 84, 184 leg portion, 86 tip end, 90, 190 inserted member, 92, 192 opening, 94 peripheral portion, 130 flange portion, 194 groove portion.

BEST MODES FOR CARRYING OUT THE INVENTION

In the following, embodiments of the present invention will be described based on the figures. It is noted that in the accompanying drawings the same or corresponding parts are denoted with the same reference numerals and the description thereof will not be repeated.

It is noted that in the embodiments described below each component is not necessarily essential to the invention unless otherwise specified. Furthermore, when the number and the amount are mentioned in the following embodiments, such number, etc. is only shown by way of illustration and the present invention is not necessarily limited to that number, etc. unless otherwise specified.

First Embodiment

Figure 1:
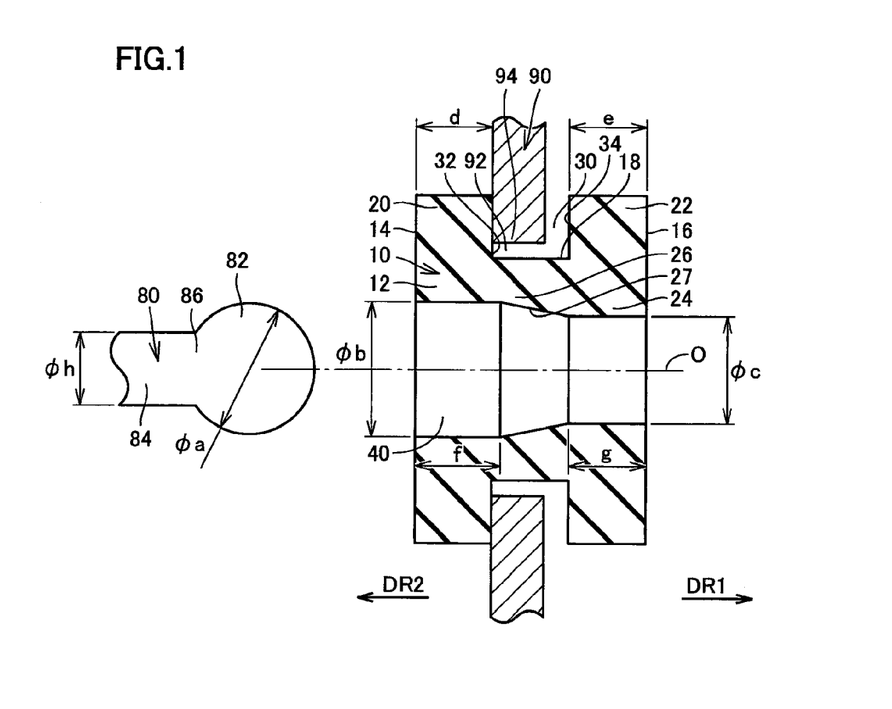
FIG. 1 is a cross-sectional schematic view showing a structure of a grommet in accordance with a first embodiment of the present invention.

FIG. 1 is a cross-sectional schematic view showing a structure of a grommet 10 in accordance with a first embodiment of the present invention. Grommet 10 in the first embodiment is formed of an elastic material, typically of a rubber material. As shown in FIG. 1, grommet 10 includes a body portion 12. Inside body portion 12, an insertion hole 40 is formed. Insertion hole 40 is formed in line symmetry with respect to a central axis O. Body portion 12 is formed in a tubular shape having central axis O common to insertion hole 40. One direction in the direction (axial direction) in which central axis O extends is referred to as a direction DR1, and the other direction is referred to as a direction DR2. As shown by the arrow in FIG. 1, the rightward direction in the figure is assumed as direction DR1 and the leftward direction in the figure is assumed as direction DR2.

An end on the direction DR2 side of the tubular body portion 12 extending along central axis O is referred to as one end 14 side, and an end on the direction DR1 side opposite to one end 14 is referred to as the other end 16 side. When an inserting member 80 is attached to an inserted member 90, inserting member 80 is inserted from the one end 14 side into insertion hole 40. Body portion 12 includes a first flange portion 20 formed on the one end 14 side of body portion 12. Body portion 12 also includes a second flange portion 22 formed on the other end 16 side with respect to one end 14.

A groove portion 30 is formed in an outer circumferential surface 18 of body portion 12 to extend in the circumferential direction. Groove portion 30 is formed in outer circumferential surface 18 between first flange portion 20 and second flange portion 22 in the axial direction. Groove portion 30 is formed such that a part of outer circumferential surface 18 of body portion 12 is depressed in an elongated shape to extend in the circumferential direction of outer circumferential surface 18. First flange portion 20 and second flange portion 22 are separated from each other in the axial direction by groove portion 30. First flange portion 20 and second flange portion 22 are each formed in the shape of a collar extending radially outward of the tubular body portion 12 with respect to groove portion 30.

Inserting member 80 is inserted into insertion hole 40 formed in body portion 12 of grommet 10. Inserting member 80 has a head portion 82 having a relatively large diameter and a leg portion 84 having a relatively small diameter. Head portion 82 is formed by increasing the diameter of a tip end 86 of leg portion 84. Inserting member 80 is put into the inside of insertion hole 40 from the head portion 82 side. Inserting member 80 is formed of a hard material with high rigidity that is not easily deformed, for example, such as a resin material or a metal material.

An opening 92 is formed in inserted member 90 to which grommet 10 is attached. A peripheral portion 94 of opening 92 formed in inserted member 90 engages with the inside of groove portion 30 formed in body portion 12 of grommet 10. The engagement of peripheral portion 94 with groove portion 30 allows grommet 10 to be attached to inserted member 90. Groove portion 30 is an example of an engagement portion which engages with peripheral portion 94 of opening 92 to attach grommet 10 to inserted member 90.

First flange portion 20 is formed to have a large diameter relative to groove portion 30. A thrust surface 32 on the other end 16 side of first flange portion 20 is opposed to inserted member 90. Outer circumferential portion 18 of body portion 12 forms a cylindrical surface. The cylindrical outer circumferential surface 18 of body portion 12 is depressed radially inward to form groove portion 30 so as to extend in the circumferential direction of outer circumferential surface 18. Thrust surface 32 forms a wall surface of groove portion 30 on the one end 14 side. Groove portion 30 has thrust surface 32 as a wall surface on one side.

The dimensions of each portion of grommet 10 and inserting member 80 will be described. Leg portion 84 of inserting member 80 has a diameter φh, and head portion 82 is formed to have a diameter φa larger than diameter φh of leg portion 84. In a region on the one end 14 side from groove portion 30 in the axial direction of body portion 12, that is, in a region in which body portion 12 forms first flange portion 20, insertion hole 40 is formed to have a diameter φb equal to or larger than diameter φa of head portion 82. An inner wall surface of insertion hole 40 forms a cylindrical shape having a diameter φb at one end 14. Insertion hole 40 is formed such that the height of the cylindrical shape (that is, the dimension in the axial direction) f is larger than a thickness d of first flange portion 20 (that is, the distance from one end 14 to thrust surface 32 in the axial direction).

On the other end 16 side with respect to the cylindrical shape having diameter φb that forms the inner wall surface of insertion hole 40 on the one end 14 side, an inner wall surface 27 of insertion hole 40 is formed to have a truncated conical side surface. On the other end 16 side from the region in which the inner wall surface of insertion hole 40 is formed in a cylindrical shape having diameter φb, the internal space of insertion hole 40 forms a truncated conical shape with a circular lower base φb and with a circular upper base φc. The part that forms this truncated conical shape forms a reduced diameter portion 26 in which the diameter of insertion hole 40 is gradually reduced from the one end 14 side toward the other end 16 side. Reduced diameter portion 26 is generally formed in the region in which groove portion 30 is formed in outer circumferential surface 18 of body portion 12.

Body portion 12 has a small diameter portion 24 provided on the other end 16 side from reduced diameter portion 26 (that is, on the other end 16 side from groove portion 30). In small diameter portion 24, insertion hole 40 is formed to have a diameter φc. Inner diameter φc of small diameter portion 24 is smaller than diameter φa of head portion 82 and is equal to or larger than diameter φh of leg portion 84. Insertion hole 40 has a diameter continuously reduced from one end 14 toward the other end 16. Insertion hole 40 is formed to have a diameter equal to diameter φa of head portion 82 of inserting member 80, at reduced diameter portion 26 formed between the cylindrical shape having diameter φb and small diameter portion 24 having diameter φc.

The dimensional relation between each portion of grommet 10 and inserting member 80 shown in FIG. 1 is written as the following mathematical expressions:

$$\phi c < \phi a \leq \phi b \quad (1)$$

$$f \geq d \quad (2)$$

$$e \approx g \quad (3)$$

where dimension g may be a dimension that satisfies the above expression (3) in relation to dimension e or may be such a dimension in that the disengagement load can be ensured (if dimension g is too small, the disengagement load becomes small) and that the cylindrical shape having diameter φb and small diameter portion 24 having diameter φc can be smoothly connected in the inner wall surface of insertion hole 40.

Figure 2:
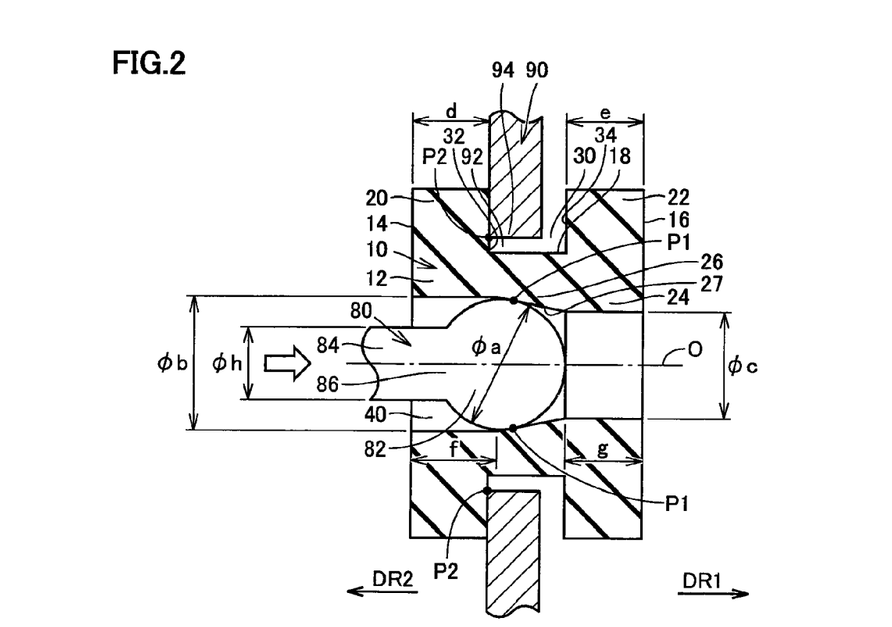
FIG. 2 is a cross-sectional schematic view showing a state in which an inserting member is inserted from the one end side into an insertion hole.
Figure 3:
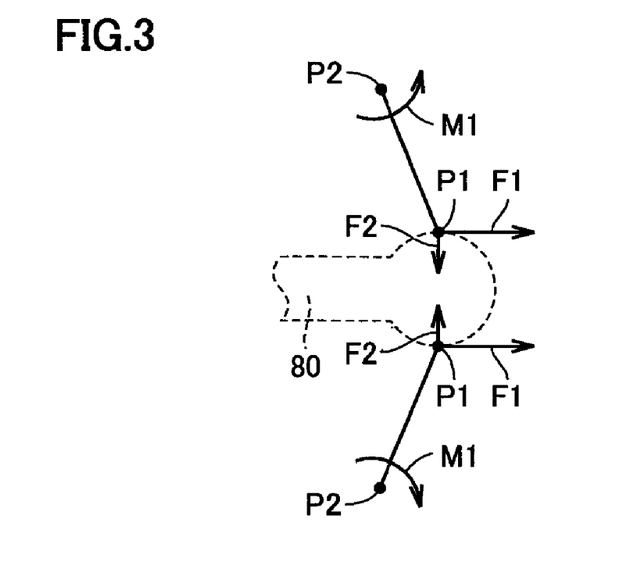
FIG. 3 is a schematic diagram showing the relation between load and moment acting between the inserting member and the grommet when the inserting member is inserted from one end side into the insertion hole.

The operation will be described in the case where inserting member 80 is inserted from the one end 14 side into insertion hole 40 of grommet 10 in the first embodiment having the structure as described above whereby inserting member 80 is attached to inserted member 90 with grommet 10 interposed therebetween. FIG. 2 is a cross-sectional schematic view showing a state in which inserting member 80 is inserted into insertion hole 40 from the one end 14 side. FIG. 3 is a schematic diagram showing the relation between load and moment acting between inserting member 80 and grommet 10 when inserting member 80 is inserted from the one end 14 side into insertion hole 40.

As shown by the thick arrow in FIG. 2, inserting member 80 is moved from the one end 14 side to the inside of insertion hole 40 formed in grommet 10. In the internal space of insertion hole 40 on the one end 14 side, that is, in the region where diameter φb of insertion hole 40 is equal to or larger than diameter φa of head portion 82, head portion 82 of inserting member 80 is in no contact with the inner wall surface of insertion hole 40 or can slide smoothly on the inner wall surface. Therefore, in this region, the insertion load of inserting member 80 is relatively small.

Head portion 82 of inserting member 80 inserted from the one end 14 side into insertion hole 40 comes into contact with inner wall surface 27 of insertion hole 40 at reduced diameter portion 26 where the diameter of insertion hole 40 is gradually reduced. Here, force F1 acting in direction DR1 is applied from inserting member 80 to grommet 10, as shown in FIG. 3. When inserting member 80 is inserted into insertion hole 40, inserting member 80 presses grommet 10 in direction DR1 to cause grommet 10 to move relative to inserted member 90 in the axial direction, so that the surface of inserted member 90 and thrust surface 32 come into surface contact with each other.

As shown in FIG. 2, the point at which inserting member 80 inserted form the one end 14 side into insertion hole 40 abuts on inner wall surface 27 of insertion hole 40 is denoted as point P1. Furthermore, the point at which the peripheral portion 94 of opening 92 formed in inserted member 90 and thrust surface 32 of grommet 10 are in contact with each other is denoted as point P2. Based on the expression (1) and the expression (2), the location of point P1 in the axial direction is on the other end 16 side with respect to thrust surface 32. Therefore, by the action of force F1, moment M1 occurs about point P2. As shown in FIG. 3, moment M1 acts on grommet 10 on the upper side in the figure with respect to central axis O in such a direction as to rotate grommet 10 counterclockwise about point P2. On the other hand, moment M1 acts on grommet 10 on the lower side in the figure with respect to central axis O in such a direction as to rotate grommet 10 clockwise about point P2.

Figure 4:
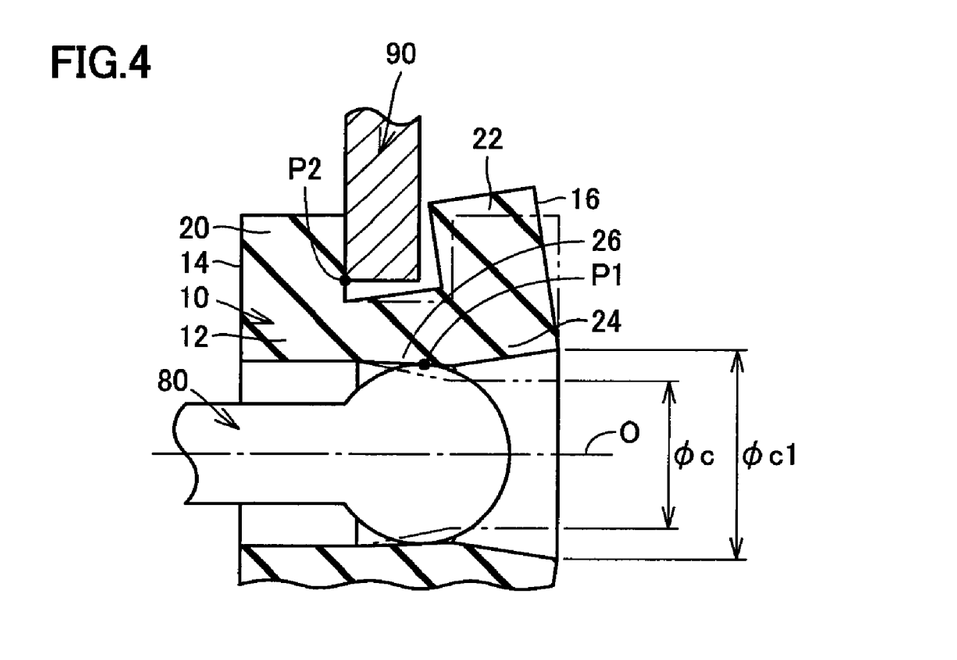
FIG. 4 is a cross-sectional schematic view showing the grommet deformed by the action of moment M1.

Grommet 10 is deformed by the action of moment M1 such that second flange portion 22 moves in the direction away from central axis O. The deformation of grommet 10 increases the diameter of insertion hole 40. At small diameter portion 24, the diameter of insertion hole 40 before the deformation of grommet 10 is φc, whereas the diameter of insertion hole 40 after the deformation of grommet 10 is φc1 larger than φc, as shown in FIG. 4. It is noted that FIG. 4 is a cross-sectional schematic view showing grommet 10 deformed by the action of moment M1.

The deformation of grommet 10 increases the diameter of insertion hole 40 that is located in the direction in which inserting member 80 is headed (in other words, direction DR1), with respect to inserting member 80. Therefore, force F2 (see FIG. 3) acting from grommet 10 on inserting member 80 decreases. This decreases the resistance against the movement of inserting member 80 from the one end 14 side toward the other end 16 side. In other words, the insertion load of inserting member 80 on grommet 10 can be reduced, and therefore, inserting member 80 can be easily fitted into grommet 10. As a result, the operator can easily attach inserting member 80 to inserted member 90 by pushing inserting member 80 into insertion hole 40, thereby improving the workability of installing inserting member 80.

In the conventional grommet, as to the insertion direction in which the inserting member is fitted into the grommet (in other words, the axial direction in which the central axis of the insertion hole extends), the dimensions of the grommet and the inserting member are not specifically defined. Therefore, when the inserting member is inserted, the grommet may be deformed such that the diameter of the insertion hole is reduced, thereby increasing the insertion load. By contrast, in grommet 10 in the present embodiment, the dimensions (dimensions d and f) of grommet 10 in the direction in which inserting member 80 is inserted are defined. Accordingly, when inserting member 80 is inserted, grommet 10 can be deformed in such a direction as to increase the diameter of insertion hole 40 and reduce the insertion load, thereby improving the workability of installing inserting member 80.

Figure 5:
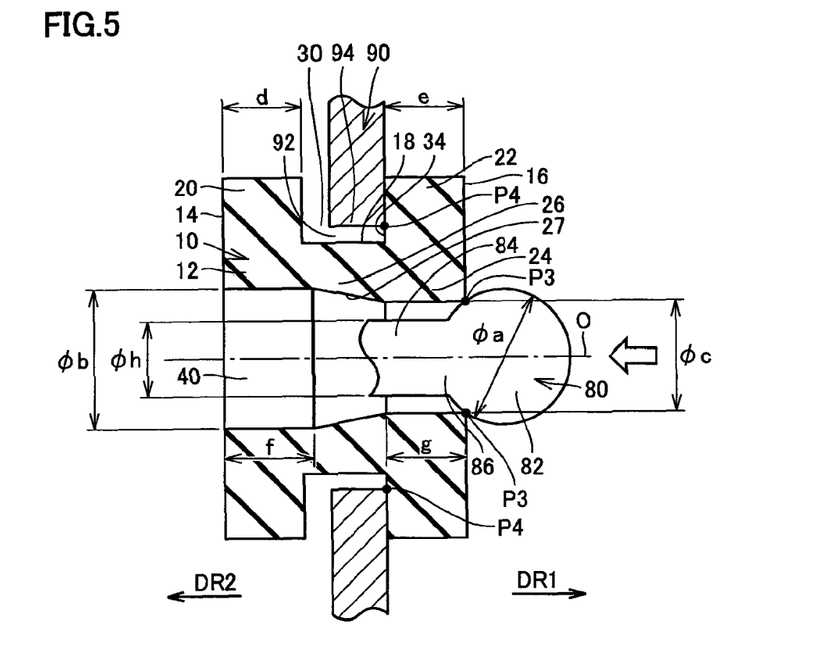
FIG. 5 is a cross-sectional schematic view showing a state in which the inserting member attempts to enter the inside of the insertion hole from the other end side.
Figure 6:
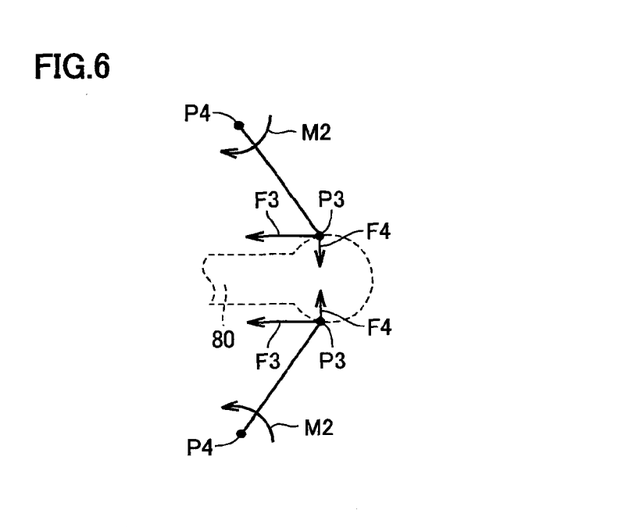
FIG. 6 is a schematic diagram showing the relation between load and moment acting between the inserting member and the grommet when the inserting member attempts to enter the inside of the insertion hole from the other end side.

Now, the operation will be described in the case where inserting member 80 attempts to enter insertion hole 40 of grommet 10 from the other end 16 side and inserting member 80 attempts to be disengaged from grommet 10. FIG. 5 is a cross-sectional schematic view showing a state in which inserting member 80 attempts to enter the inside of insertion hole 40 from the other end 16 side. FIG. 6 is a schematic diagram showing the relation between load and moment acting between inserting member 80 and grommet 10 when inserting member 80 attempts to enter the inside of insertion hole 40 from the other end 16 side.

FIG. 5 shows the state in which head portion 82 of inserting member 80 passes through insertion hole 40 and reaches the other end 16 side of grommet 10, whereby a component having inserting member 80 as an attachment is attached to inserted member 90. Grommet 10 is interposed between inserted member 90 and inserting member 80 inserted into opening 92 of inserted member 90, whereby inserting member 80 and a component having inserting member 80 as an attachment are attached to inserted member 90.

In this state, as shown by the thick arrow in FIG. 5, when inserting member 80 attempts to enter the inside of insertion hole 40 from the other end 16 side to be disengaged from grommet 10, head portion 82 having diameter $\phi a$ larger than diameter $\phi c$ of small diameter portion 24 comes into contact with grommet 10. Head portion 82 is in contact with grommet 10 at point P3 located at the peripheral portion of insertion hole 40 on the other end 16 side.

Here, as shown in FIG. 6, force F3 acting in direction DR2 is applied on grommet 10 from inserting member 80. When inserting member 80 attempts to move into insertion hole 40 in an attempt to disengage from grommet 10, grommet 10 is pressed by inserting member 80 in direction DR2, so that inserted member 90 and a thrust surface 34 shown in FIG. 5 come into surface contact with each other. Thrust surface 34 is a thrust surface of second flange portion 22 on the one end 14 side.

As shown in FIG. 5, the location of point P3, at which inserting member 80 in an attempt to enter insertion hole 40 from the other end 16 side abuts on grommet 10, is on the other end 16 side with respect to thrust surface 34. Therefore, by the action of force F3, moment M2 acts about point P4 where peripheral portion 94 of opening 92 formed in inserted member 90 and thrust surface 34 of grommet 10 are in contact with each other. As shown in FIG. 6, moment M2 acts on grommet 10 on the upper side in the figure with respect to central axis O in such a direction as to rotate grommet 10 clockwise about point P4. On the other hand, moment M2 acts on grommet 10 on the lower side in the figure with respect to central axis O in such a direction as to rotate grommet 10 counterclockwise about point P4.

Figure 7:
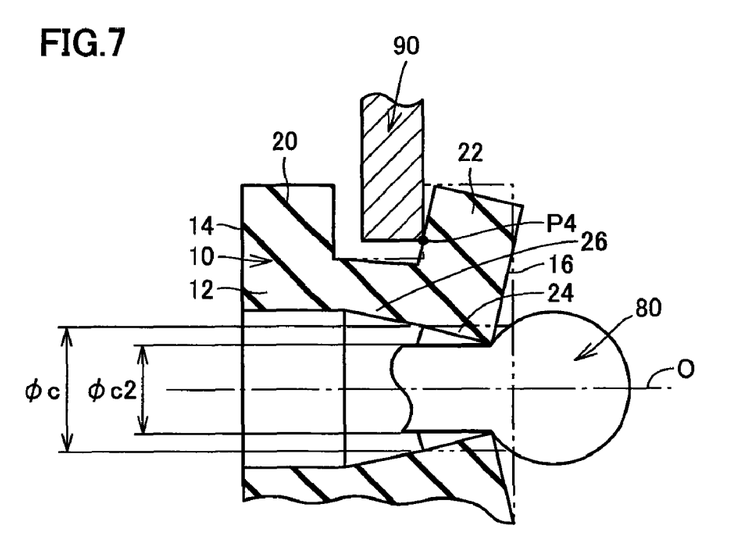
FIG. 7 is a cross-sectional schematic view showing the grommet deformed by the action of moment M2.

Grommet 10 is deformed by the action of moment M2 such that second flange portion 22 moves in a direction to approach central axis O. The deformation of grommet 10 reduces the diameter of insertion hole 40. At small diameter portion 24, the diameter of insertion hole 40 before the deformation of grommet 10 is $\phi c$, whereas the diameter of insertion hole 40 after the deformation of grommet 10 is $\phi c2$ smaller than $\phi c$, as shown in FIG. 7. It is noted that FIG. 7 is a cross-sectional schematic view showing grommet 10 deformed by the action of moment M2.

In this manner, grommet 10 is deformed in such a manner as to catch up inserting member 80 that attempts to enter insertion hole 40 from the other end 16 side, and the diameter of insertion hole 40 located in the direction in which inserting member 80 is headed is reduced, so that force F4 (see FIG. 6) acting on inserting member 80 from grommet 10 increases. This increases the resistance against the movement of inserting member 80 from the other end 16 side toward the one end 14 side. In other words, the disengagement load of inserting member 80 on grommet 10 can be increased. As a result, inserting member 80 cannot be easily disengaged from grommet 10, thereby preventing inserting member 80 from being detached from insertion hole 40.

Second Embodiment

Figure 8:
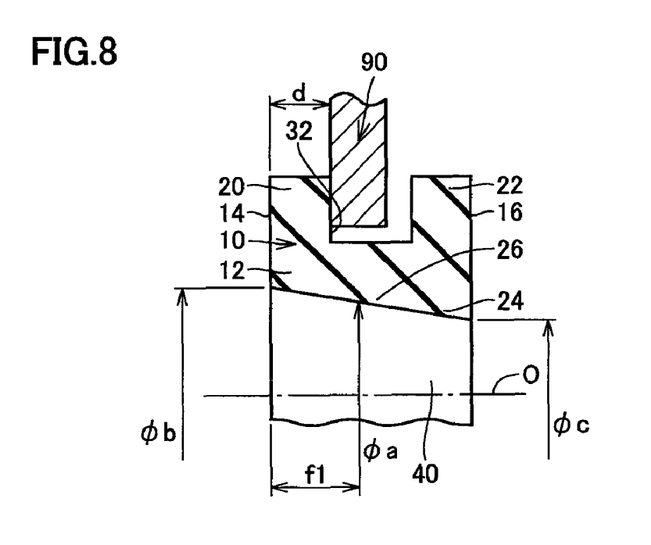
FIG. 8 is a cross-sectional schematic view showing a structure of a grommet in accordance with a second embodiment.

FIG. 8 is a cross-sectional schematic view showing a structure of grommet 10 in accordance with a second embodiment. The shape of insertion hole 40 is not limited to the shape illustrated in the first embodiment. For example, as shown in FIG. 8, insertion hole 40 having an inner wall surface in the shape of a conical surface may be formed in body portion 12, and insertion hole 40 may be formed in such a shape in that the diameter monotonically decreases continuously at the uniform ratio from the one end 14 side toward the other end 16 side of grommet 10.

Similar to the first embodiment, insertion hole 40 in the second embodiment may be formed such that the peripheral portion of insertion hole 40 on the one end 14 side is formed of a circle having diameter $\phi b$ larger than diameter $\phi a$ of head portion 82 and that diameter $\phi c$ of insertion hole 40 at small diameter portion 24 on the other end 16 side is smaller than diameter $\phi a$ of head portion 82 and is equal to or larger than diameter $\phi h$ of leg portion 84. Insertion hole 40 in the second embodiment forms reduced diameter portion 26 in which the diameter is gradually reduced from one end 14 to the other end 16 along the entire length in the axial direction. Insertion hole 40 is formed to have diameter $\phi a$ equal to the diameter of head portion 82, at reduced diameter portion 26.

Here, insertion hole 40 is formed such that distance f1 in the axial direction from one end 14 of grommet 10 to the location where the diameter of insertion hole 40 is $\phi a$ is equal to or greater than distance d from one end 14 to thrust surface 32. Furthermore, insertion hole 40 is formed such that the peripheral portion thereof on the other end 16 side has diameter $\phi c$ smaller than diameter $\phi a$ of head portion 82.

In this manner, the insertion load of inserting member 80 on grommet 10 can be reduced by the action of the forces (F1 to F4) and moment (M1 to M2) acting between inserting member 80 and grommet 10 as illustrated with reference to FIG. 3 and FIG. 6, so that inserting member 80 can be easily fitted into grommet 10. In addition, the disengagement load of inserting member 80 on grommet 10 can be increased, so that inserting member 80 is not easily disengaged from grommet 10.

Third Embodiment

Figure 9:
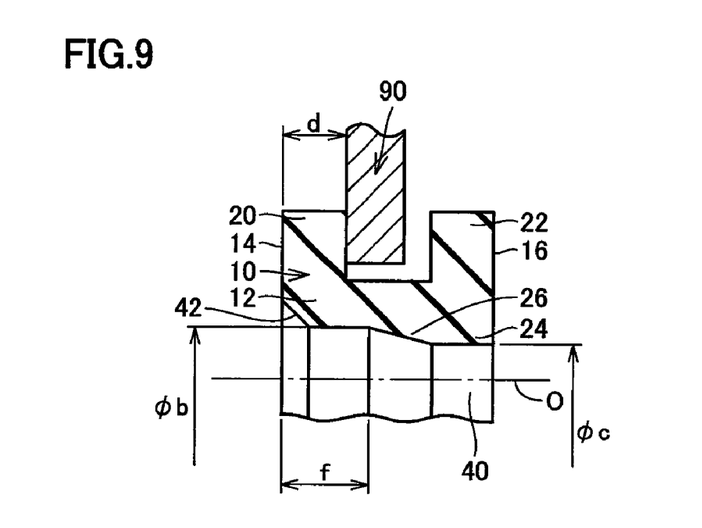
FIG. 9 is a cross-sectional schematic view showing a structure of a grommet in accordance with a third embodiment.

FIG. 9 is a cross-sectional schematic view showing a structure of grommet 10 in accordance with a third embodiment. Grommet 10 in the third embodiment differs from grommet 10 in the first embodiment in that a tapered portion 42 is formed at the peripheral portion of insertion hole 40 on the one end 14 side and that the diameter of insertion hole 40 on the one end 14 side is larger than $\phi b$.

If insertion hole 40 is formed such that diameter $\phi b$ of the cylindrically shaped portion formed on the one end 14 side of insertion hole 40 is equal to diameter $\phi a$ of head portion 82, or $\phi b$ is slightly larger than $\phi a$, it may be difficult to put inserting member 80 into insertion hole 40 thereby deteriorating the workability. By contrast, as with insertion hole 40 in the third embodiment, which is provided with tapered portion 42, insertion hole 40 is formed such that the diameter at the peripheral portion on the one end 14 side is even larger than $\phi b$, whereby inserting member 80 can be inserted into insertion hole 40 more easily. In other words, the workability of fitting inserting member 80 into the inside of insertion hole 40 is even further improved, so that the operator can attach inserting member 80 to inserted member 90 more easily.

Fourth Embodiment

Figure 10:
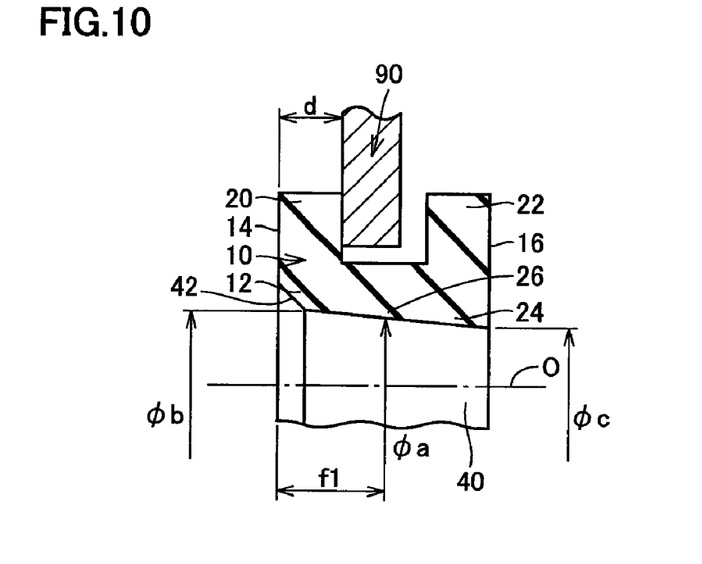
FIG. 10 is a cross-sectional schematic view showing a structure of a grommet in accordance with a fourth embodiment.

FIG. 10 is a cross-sectional schematic view showing a structure of grommet 10 in accordance with a fourth embodiment. Grommet 10 in the fourth embodiment differs from grommet 10 in the second embodiment in that tapered portion 42 is formed at the peripheral portion of insertion hole 40 on the one end 14 side and that the diameter of insertion hole 40 on the one end 14 side is larger than $\phi b$, as in the third embodiment.

Because of insertion hole 40 formed in this manner, inserting member 80 can be inserted into insertion hole 40 more easily, as compared with grommet 10 in the second embodiment. In other words, the workability of fitting inserting member 80 into the inside of insertion hole 40 is even further improved, so that the operator can attach inserting member 80 to inserted member 90 more easily.

Fifth Embodiment

Figure 11:
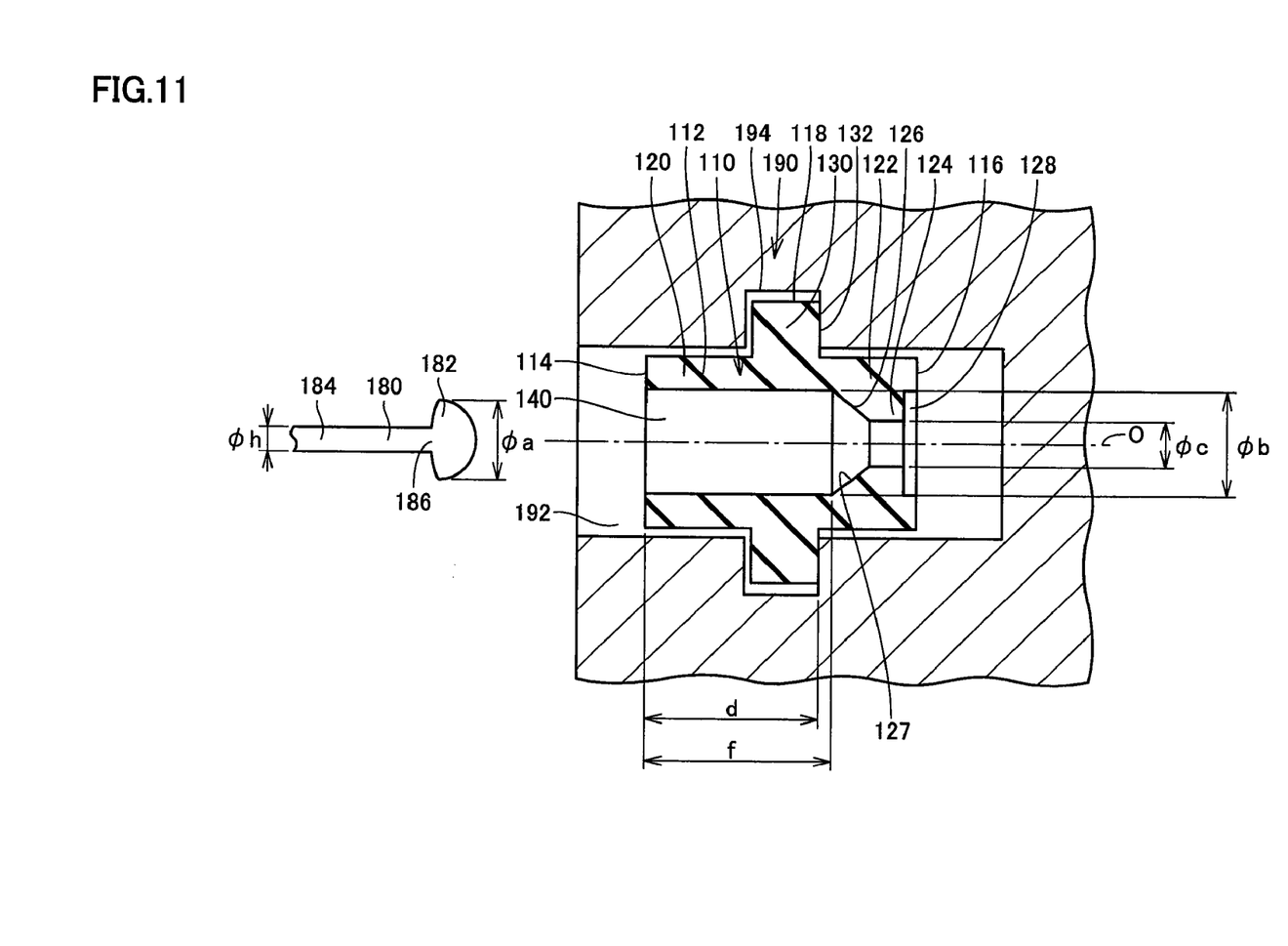
FIG. 11 is a cross-sectional schematic view showing a structure of a grommet in accordance with a fifth embodiment.

FIG. 11 is a cross-sectional schematic view showing a structure of a grommet 110 in accordance with a fifth embodiment. The description in the first to fourth embodiments provides an example in which insertion hole 40 formed in grommet 10 has a diameter continuously reduced from the one end 14 side toward the other end 16 side, groove portion 30 is formed in outer circumferential surface 18 of body portion 12, and peripheral portion 94 of opening 92 of inserted member 90 engages with the inside of groove portion 30. Grommet 10 in accordance with the present invention is not limited to such a structure. More specifically, the diameter of insertion hole 40 formed in grommet 10 may not be continuously reduced. Furthermore, the engagement portion in which grommet 10 engages with inserted member 90 is not limited to groove portion 30 as long as the engagement portion is formed in the outer circumferential surface on the outer side of insertion hole 40 in the radial direction orthogonal to the axial direction.

Specifically, as shown in FIG. 11, grommet 110 in the fifth embodiment includes a body portion 112 having an insertion hole 140 inside. Insertion hole 40 is formed in line symmetry with respect to central axis O. Body portion 112 is formed in a tubular shape having central axis O common to insertion hole 140. Body portion 112 includes a flange portion 130 in the shape of a collar formed to protrude radially outward of the tubular shape.

An opening 192 is formed in an inserted member 190 to which grommet 110 is attached. A groove portion 194 is formed in opening 192 formed in inserted member 190. Groove portion 194 is formed such that a part of the inner circumferential surface of opening 192 is depressed in an elongated shape to extend in the circumferential direction on the inner circumferential surface. Flange portion 130 engages with the inside of groove portion 194 whereby grommet 110 is attached to inserted member 190. Flange portion 130 is an example of the engagement portion which engages with opening 192 to attach grommet 110 to inserted member 190.

A thrust surface 132 of flange portion 130 on the other end 116 side is opposed to inserted member 190. An outer circumferential surface 118 of body portion 112 forms a cylindrical surface, and flange portion 130 is formed such that the cylindrical outer circumferential surface 118 protrudes radially outward to extend in the circumferential direction. Flange portion 130 has thrust surface 132 which forms the wall surface on the other end 116 side.

The dimensions of each portion of grommet 110 in the fifth embodiment having such a structure and an inserting member 180 are defined similarly to the first embodiment. More specifically, a head portion 182 of inserting member 180 is formed to have diameter $\phi a$ larger than diameter $\phi h$ of a leg portion 184. In the region on the one end 114 side from flange portion 130 in the axial direction of body portion 112 and in the region where flange portion 130 is formed, diameter $\phi b$ of insertion hole 140 is equal to or larger than diameter $\phi a$ of head portion 182. The inner wall surface of insertion hole 140 forms a cylindrical shape having diameter $\phi b$ at one end 114. Insertion hole 140 is formed such that the height of the cylindrical shape (that is, the dimension in the axial direction) f is greater than distance d in the axial direction from one end 114 to thrust surface 132.

On the one end 114 side, the inner wall surface of insertion hole 140 is formed in a cylindrical shape having diameter $\phi b$. On the other end 116 side with respect to the cylindrical shape having diameter $\phi b$, an inner wall surface 127 of insertion hole 140 is formed in the shape of a truncated conical side surface. On the other end 116 side from the region in which the inner wall surface of insertion hole 140 is formed in a cylindrical shape having diameter $\phi b$, the internal space of insertion hole 140 forms a truncated conical shape with a circular lower base $\phi b$ and with a circular upper base $\phi c$. The part that forms this truncated conical shape forms a reduced diameter portion 126. In reduced diameter portion 126, the diameter of insertion hole 140 is gradually reduced from the one end 114 side toward the other end 116 side. Reduced diameter portion 126 is formed on the other end 116 side from the region where flange portion 130 is formed in outer circumferential surface 118 of body portion 112.

Body portion 112 has a small diameter portion 124 on the other end 116 side from reduced diameter portion 126 (in other words, on the other end 116 side from thrust surface 132 of flange portion 130). Diameter $\phi c$ of insertion hole 140 at small diameter portion 124 is smaller than diameter $\phi a$ of head portion 182 and is equal to or larger than diameter $\phi h$ of leg portion 184.

Insertion hole 40 has a diameter increased at the peripheral portion on the other end 116 side. Insertion hole 40 on the other end 116 side with respect to small diameter portion 124 forms an increased diameter portion 128. Increased diameter portion 128 has a diameter larger than diameter $\phi c$ of small diameter portion 124. In other words, the diameter of insertion hole 140 in the fifth embodiment is not continuously reduced from one end 114 toward the other end 116, and increased diameter portion 128 formed on the other end 116 side with respect to small diameter portion 124 has a diameter relatively larger than small diameter portion 124.

In this manner, similarly to the first embodiment, the insertion load of inserting member 180 on grommet 110 can be reduced by the action of the forces and moment (forces F1 to F4 and moment M1 to M2 illustrated with reference to FIG. 3 and FIG. 6) acting between inserting member 180 and grommet 110, so that inserting member 180 can be easily fitted into grommet 110. In addition, the disengagement load of inserting member 180 on grommet 110 can be increased, so that inserting member 180 is not easily disengaged from grommet 110.

Sixth Embodiment

Figure 12:
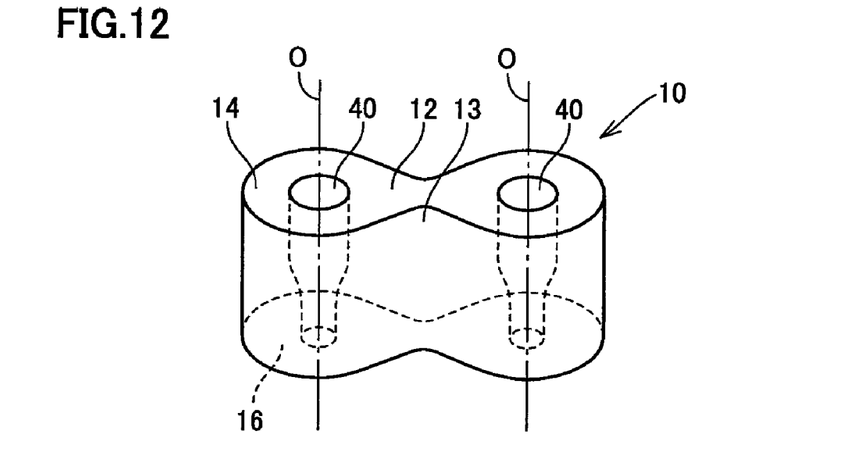
FIG. 12 is a perspective view showing a structure of a grommet in accordance with a sixth embodiment.

FIG. 12 is a perspective view showing a structure of grommet 10 in accordance with a sixth embodiment. The first to fifth embodiments provide an example in which one insertion hole 40 is formed in body portion 12 of grommet 10, and body portion 12 of grommet 10 is formed in a tubular shape symmetric with respect to central axis O of insertion hole 40. However, a plurality of insertion holes 40 may be formed in one grommet 10. In this case, body portion 12 may not be symmetric with respect to central axis O. FIG. 12 shows an example in which two members each having an approximately cylindrical shape are joined to each other at a joint portion 13 to form body portion 12, and insertion hole 40 is formed in each of the approximately cylindrical members.

Even when grommet 10 in the sixth embodiment having such a structure is used, the shape of insertion hole 40 is defined similarly to the first embodiment, thereby reducing the insertion load of inserting member 80 on grommet 10 and increasing the disengagement load of inserting member 80 on grommet 10.

Seventh Embodiment

Figure 13:
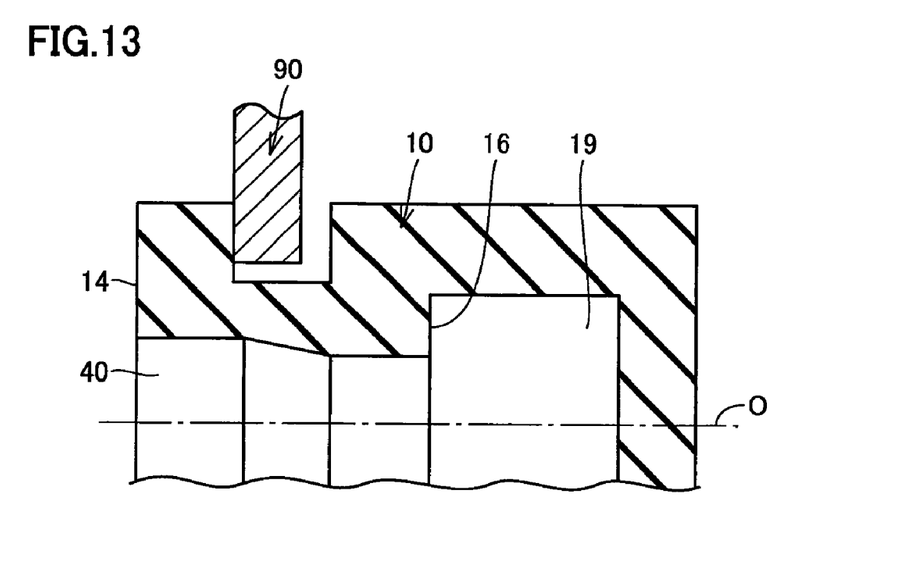
FIG. 13 is a cross-sectional schematic view showing a structure of a grommet in accordance with a seventh embodiment.

FIG. 13 is a cross-sectional schematic view showing a structure of grommet 10 in accordance with a seventh embodiment. The first to sixth embodiments provide an example in which insertion hole 40 formed in grommet 10 passes through body portion 12 in the axial direction. However, insertion hole 40 may not pass through body portion 12 in the axial direction, FIG. 13 shows an example in which a space 19 is formed in the inside of grommet 10 on the other end 16 side of insertion hole 40 and insertion hole 40 does not pass through grommet 10 in the axial direction.

Even when grommet 10 in the seventh embodiment having such a structure is used, the shape of insertion hole 40 is defined similarly to the first embodiment, thereby reducing the insertion load of inserting member 80 on grommet 10 and increasing the disengagement load of inserting member 80 on grommet 10.

Although the embodiments of the present invention have been described as above, the embodiments disclosed here should be understood as being illustrative in all respects rather than being limitative. The scope of the present invention is shown not in the foregoing description but in the claims, and it is intended that all modifications that come within the meaning and range of equivalence to the claims are embraced here.

INDUSTRIAL APPLICABILITY

The present invention may be applied advantageously in particular to a grommet for use in attaching equipment or components mounted on vehicles, for example, such as a grommet for use to attach a sound insulation cover lid to a sound insulation cover body.

The invention claimed is:

1. A grommet which engages with a peripheral portion of an opening formed in an inserted member and is interposed between an inserting member inserted into said opening and said inserted member to attach said inserting member to said inserted member, comprising
a tubular body portion having an insertion hole into which said inserting member is inserted,
said body portion including a first flange portion shaped in a collar protruding radially outward of said body portion at one end and a second flange portion shaped in a collar protruding radially outward of said body portion at the other end which is opposite to said one end, wherein
in an outer circumferential surface of said body portion, a groove portion is formed such that a part of said outer circumferential surface is depressed in an elongated shape along a circumferential direction of said outer circumferential surface between said first flange portion and said second flange portion in an axial direction, said groove portion engaging with said peripheral portion to attach said grommet to said inserted member,
said first flange portion has a thrust surface on a side thereof,
said second flange portion has another thrust surface on a side thereof such that said another thrust surface faces said thrust surface,
said inserting member, having a leg portion and a head portion formed by increasing a diameter of a tip end of said leg portion, is inserted from said one end of said body portion into said insertion hole and is attached to said inserted member,
on said one end, a diameter of said insertion hole is equal to or larger than a diameter of said head portion, and
on said other end, said grommet has a small diameter portion in which a diameter of said insertion hole is smaller than the diameter of said head portion and is equal to or larger than a diameter of said leg portion,
when said inserting member is inserted from said one end into said insertion hole, said inserting member abuts on an inner wall surface of said insertion hole, said thrust surface comes into surface contact with said inserted member, and said second flange portion is deformed such that the diameter of said insertion hole is increased, and
when said inserting member attempts to be disengaged from said grommet, said inserting member abuts on said other end, said another thrust surface comes into surface contact with said inserted member, and said second flange portion is deformed such that the diameter of said insertion hole is reduced.

2. The grommet according to claim 1, wherein
said grommet has a reduced diameter portion in which a diameter of said insertion hole is gradually reduced from said one end toward the other end, and
said insertion hole is formed to have a diameter equal to the diameter of said head portion, at said reduced diameter portion.

* * * * *